(12) United States Patent
Roberts

(10) Patent No.: US 9,972,002 B2
(45) Date of Patent: *May 15, 2018

(54) MOBILE WIRELESS FINANCIAL INSTRUMENT FOR AUTOMATICALLY SELECTING A PAYMENT INSTRUMENT

(71) Applicant: QUALCOMM Incorporated, San Diego, CA (US)

(72) Inventor: John Richard Roberts, Beaverton, OR (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/156,128

(22) Filed: Jan. 15, 2014

(65) Prior Publication Data

US 2014/0136402 A1 May 15, 2014

Related U.S. Application Data

(63) Continuation of application No. 13/044,852, filed on Mar. 10, 2011, now Pat. No. 8,666,891, which is a
(Continued)

(51) Int. Cl.
*G06Q 20/24* (2012.01)
*G06Q 20/10* (2012.01)
(Continued)

(52) U.S. Cl.
CPC ............. *G06Q 20/24* (2013.01); *G06Q 20/10* (2013.01); *G06Q 20/20* (2013.01); *G06Q 20/202* (2013.01);
(Continued)

(58) Field of Classification Search
CPC ..... G06Q 20/32; G06Q 20/322; G06Q 20/327
(Continued)

(56) References Cited

U.S. PATENT DOCUMENTS 5,208,446 A 5/1993 Martinez
5,221,838 A 6/1993 Gutman et al.
(Continued)

FOREIGN PATENT DOCUMENTS

CN 1751325 A 3/2006
CN 1835007 A 9/2006
(Continued)

OTHER PUBLICATIONS

Unknown, Subscriber identity module, Jun. 7, 2006, www.wikipedia.org, Subscriber identity module.*
(Continued)

*Primary Examiner* — Scott S Trotter
(74) *Attorney, Agent, or Firm* — Muncy, Geissler, Olds & Lowe, P.C./Qualcomm

(57) ABSTRACT

The specification and drawing figures describe and illustrate a point-of-sale payment system. The point-of-sale payment system includes a mobile wireless communications instrument having at least one data processor. The data processor is capable of automatically selecting a payment instrument for transmitting a payment sum across a mobile wireless communications network and, if necessary, a credit network. The point-of-sale payment system may also include a data transmission subsystem for receipt, storage, processing, and transmittal of data across the wireless communications network and/or the data transmission subsystem.

52 Claims, 10 Drawing Sheets

Related U.S. Application Data continuation of application No. 12/042,488, filed on Mar. 5, 2008, now Pat. No. 7,930,249, which is a continuation-in-part of application No. 11/776,016, filed on Jul. 11, 2007, now abandoned.

(51) Int. Cl.
*G06Q 20/20* (2012.01)
*G06Q 20/32* (2012.01)
*G06Q 20/38* (2012.01)
*G06Q 20/40* (2012.01)

(52) U.S. Cl.
CPC .......... *G06Q 20/204* (2013.01); *G06Q 20/32* (2013.01); *G06Q 20/322* (2013.01); *G06Q 20/325* (2013.01); *G06Q 20/3224* (2013.01); *G06Q 20/382* (2013.01); *G06Q 20/403* (2013.01); *G06Q 20/405* (2013.01); *G06Q 20/327* (2013.01)

(58) Field of Classification Search
USPC .............................................. 705/41, 64, 65
See application file for complete search history.

(56) References Cited

U.S. PATENT DOCUMENTS

| | | | |
|---|---|---|---|
| 5,387,784 A | 2/1995 | Sarradin | |
| 5,490,251 A | 2/1996 | Clark et al. | |
| 6,612,488 B2 | 9/2003 | Suzuki | |
| 6,934,689 B1 | 8/2005 | Ritter et al. | |
| 7,128,274 B2 | 10/2006 | Kelley et al. | |
| 7,273,168 B2 | 9/2007 | Linlor | |
| 7,360,697 B1 | 4/2008 | Sarkar et al. | |
| 7,376,583 B1 * | 5/2008 | Rolf .................. | G06Q 20/20 705/17 |
| 7,447,494 B2 | 11/2008 | Law et al. | |
| 7,512,567 B2 | 3/2009 | Bemmel et al. | |
| 7,881,658 B2 | 2/2011 | Weisman et al. | |
| 7,930,249 B2 | 4/2011 | Roberts | |
| 8,085,913 B2 | 12/2011 | Wilkes | |
| 8,224,375 B2 | 7/2012 | Roberts | |
| 8,594,721 B2 | 11/2013 | Roberts | |
| 2002/0111916 A1 | 8/2002 | Coronna et al. | |
| 2003/0220835 A1 | 11/2003 | Barnes | |
| 2004/0044627 A1 | 3/2004 | Russell et al. | |
| 2005/0125343 A1 | 6/2005 | Mendelovich | |
| 2005/0154796 A1 | 7/2005 | Forsyth | |
| 2005/0160014 A1 | 7/2005 | Moss et al. | |
| 2005/0187873 A1 | 8/2005 | Labrou et al. | |
| 2005/0274793 A1 | 12/2005 | Cantini et al. | |
| 2006/0004641 A1 | 1/2006 | Moore et al. | |
| 2006/0079282 A1 | 4/2006 | Niimi | |
| 2006/0095357 A1 | 5/2006 | Tanumihardja et al. | |
| 2006/0165060 A1 | 7/2006 | Dua | |
| 2006/0178986 A1 | 8/2006 | Giordano et al. | |
| 2007/0057038 A1 | 3/2007 | Gannon | |
| 2007/0084913 A1 | 4/2007 | Weston | |
| 2007/0228144 A1 | 10/2007 | Knackstedt et al. | |
| 2007/0254712 A1 | 11/2007 | Chitti | |
| 2007/0262134 A1 | 11/2007 | Humphrey et al. | |
| 2007/0265006 A1 | 11/2007 | Washok et al. | |
| 2007/0278290 A1 | 12/2007 | Messerges et al. | |
| 2008/0011825 A1 | 1/2008 | Giordano et al. | |
| 2008/0040284 A1 | 2/2008 | Hazel et al. | |
| 2008/0052189 A1 | 2/2008 | Walker et al. | |
| 2008/0082421 A1 | 4/2008 | Onyon et al. | |
| 2009/0018954 A1 | 1/2009 | Roberts | |
| 2009/0076966 A1 | 3/2009 | Bishop et al. | |
| 2011/0161188 A1 | 6/2011 | Roberts | |

FOREIGN PATENT DOCUMENTS

| | | |
|---|---|---|
| CN | 1906590 A | 1/2007 |
| CN | 101098361 A | 1/2008 |
| EP | 1087314 A2 | 3/2001 |
| EP | 1540625 A2 | 6/2005 |
| JP | 2002150102 A | 5/2002 |
| JP | 2002269485 A | 9/2002 |
| JP | 2002279320 A | 9/2002 |
| JP | 2003076958 A | 3/2003 |
| JP | 2003272047 A | 9/2003 |
| JP | 2004145877 A | 5/2004 |
| JP | 2005148924 A | 6/2005 |
| JP | 2006093912 A | 4/2006 |
| JP | 2007102319 A | 4/2007 |
| JP | 2007141055 A | 6/2007 |
| KR | 20020076750 A | 10/2002 |
| KR | 20040016770 A | 2/2004 |
| KR | 20050023102 A | 3/2005 |
| KR | 20060114032 A | 11/2006 |
| KR | 20070053680 A | 5/2007 |
| WO | WO-9705731 A1 | 2/1997 |
| WO | WO-0075885 A1 | 12/2000 |
| WO | WO-0213444 A2 | 2/2002 |
| WO | WO-02080122 A1 | 10/2002 |
| WO | WO-2005079254 | 9/2005 |
| WO | WO-2005098769 A1 | 10/2005 |
| WO | WO-2007081519 A2 | 7/2007 |
| WO | WO-2007116521 A1 | 10/2007 |
| WO | WO-2008086428 A1 | 7/2008 |

OTHER PUBLICATIONS

Unknown, Bus (computing), Jun. 23, 2006, www.wikipedia.org, Bus (computing).*
Unknown, Credit card fraud, Jun. 28, 2006, www.wikipedia.org, Credit card fraud.*
Unknown, Credit card fraud, Jun. 23, 2006, www.wikipedia.org.*
Unknown, Bus (computing), Jun. 10, 2006, www.wikipedia.org.*
Unknown, Subscriber identity module: Revision history, Jun. 7, 2006, www.wikipedia.org.*
International Search Report—PCT/US2008/069711, International Searching Authority—European Patent Office—dated Oct. 22, 2008.
International Search Report—PCT/US2009/035055, International Searching Authority—European Patent and trademark Office—dated Jun. 4, 2009.
Khachtchanski et al. "Universal SIM toolkit-based client for mobile authorization system," IIWAS 2001, International Conference of Information Integration and Web-based Applications and Services, pp. 337-344.
Knospe et al., "Secure mobile commerce1," Security for Mobility, Chapter 14, IEE Telecommunications Series 15, 2004, pp. 325-345.
Mallalieu et al., "Pro Poor Mobile Capabilities: Service Offering in Latin America and the Caribbean," DIRSI Regional Dialogue on the Information Society, Mobile Opportunities: Background Paper, 2007, 55 pages.
Munro, "Mobile Phone Primed for Contactless Payment," Telecommunication Americas, Horizon House, 2006, pp. 12-13
Ng-Krulle et al., "The Price of Convenience: Implications of Socially Pervasive Computing for Personal Privacy," School of Computer and Information Science, University of South Australia, 2006, 300 pages.
Rouibah, "Does Mobile Payment Technology Mnet Attract Potential Consumers" The Case of Kuwait, ACIS 2007 Proceedings, Paper 24, 14 pages.
Sanders, "From EMV to NFC: the contactless trail", Card Technology Today, Elsevier, Mar. 2008, pp. 12-13.
Schwiderski-Grosche et al., "Secure M-Commerce," Electron. Commun. Eng. J., 2002, 16 pages.
Stanley, "Banking Technology," IBC Business Publishing, Apr. 2004, pp. 24-26.
Witteman et al., "Efficient proximity detection among mobile clients using the GSM network," EEMCS: Electrical Engineering, Mathematics and Computer Science, 2007, 83 pages.
Written Opinion—PCT/US2008/069711, International Searching Authority—European Patent Office—dated Oct. 22, 2008.

(56) References Cited

OTHER PUBLICATIONS

Written Opinion—PCT/US2009/035055, International Searching Authority—European Patent and Trademark Office—dated Jun. 4,2009.
Supplementary European Search Report—EP09717443—Search Authority—Munich—dated May 18, 2017.

* cited by examiner

MOBILE WIRELESS FINANCIAL INSTRUMENT FOR AUTOMATICALLY SELECTING A PAYMENT INSTRUMENT

CROSS-REFERENCE TO RELATED APPLICATIONS

This application is a continuation of and claims priority to co-pending U.S. application Ser. No. 13/044,852 filed on Mar. 10, 2011, which is a continuation of and claims priority to U.S. application Ser. No. 12/042,488 filed on Mar. 5, 2008 and patented as U.S. Pat. No. 7,930,249, which is a continuation-in-part of U.S. application Ser. No. 11/776,016 filed on Jul. 11, 2007, now abandoned, all of which are incorporated by reference herein in their entirety.

FIELD

The apparatus, system, and methods described, illustrated, and claimed in this document relate generally to a mobile wireless communications instrument capable of allowing a user to conduct financial transactions across one or more communications networks. More specifically, the mobile wireless communications instrument is capable of allowing a consumer to effect payments across a credit network by charging a payment to one or more payment instruments of the user. The mobile wireless communications instrument also is capable of collecting, storing, and transmitting a wide range of customer financial data, personal information, business information, and other information across a wireless communications system.

The apparatus and methods disclosed and claimed in the Parent Application have proven useful in a wide variety of applications and circumstances. The additional optimizations disclosed, illustrated and claimed in this document provide a mobile wireless financial instrument for substantially automatically selecting a payment instrument by including in the mobile wireless communications instrument one or more payment decision algorithms that are responsive to programmable preferences by the user of the mobile wireless financial instrument for selecting a payment instrument based on the context of a user's desire to effect a payment.

BACKGROUND

The use of credit cards, debit cards, and similar payment instruments has been the universally preferred means for most consumer purchases of goods and even services. Current constructs for effecting consumer purchases across a financial institution credit network are limited to use of a single payment instrument in connection with a purchase. Currently, a consumer must have in the consumer's possession a plastic payment instrument, such as a credit card or debit card having a magnetic strip, or being contactless in nature. At the point-of-sale, a credit card reader, or terminal, or similar point-of-sale payment device is provided that requires the consumer to successfully swipe the payment instrument through the point-of-sale device. Over time, from repetitive use, the magnetic strip on the payment instrument degrades, and data embedded in the magnetic strip may become unreadable for a variety of causes by a point-of-sale device. Degradation of the magnetic strip may cause payment rejection although the consumer may be the authentic owner of the payment instrument. Authentication or verification of the customer is limited to data and information embedded in the magnetic strip of the payment instrument: whoever possesses the payment instrument can affect purchases. The use of personal identification numbers solves the problems neither of customer identification nor customer verification. Customer authentication fails to overcome problems of lost or stolen payment instruments, degraded instruments, or loss of functionality between the payment instrument and point-of-sale payment devices.

There is a worldwide need, therefore, for a secure point-of-sale payment system that allows a consumer, or customer, to selectively direct payments from at least one payment instrument, as well as from more than one payment instrument, without the need to have in the customer's possession a plastic rendition of the payment instrument. There exists also a need for such a system to reduce problems arising from loss of payment instruments, fraud, and rejected payments, while allowing a customer to make payments from a variety of payment instruments based on logical criteria such as varying interest rates, amounts previously charged to the payment instrument, locale in which the payment is made (for example, a customer may have U.S. payment instruments for transaction in the United States, but a Spanish payment instrument, for example, for frequent trips to Spain).

A worldwide demand also exists for a system that permits a customer to selectively direct payments from one or more payment instruments by use of a portable, or mobile, wireless communication instrument commonly in possession of customers worldwide. At least one example of such a portable, or mobile, wireless communications instrument is a cellular telephone, but any wireless communications instrument to which a computer and/or data processing system may be operatively connected may be used other than a cellular telephone.

In addition, due in part to increasing mobility of people worldwide, and extensive national and international travel for business and/or pleasure, a need exists for a mobile wireless financial device capable of collecting, storing, receiving, and transmitting a wide range of customer financial data, personal information, and business information that may be revised, updated, and provided across a wireless communications system.

Currently, the well-known credit/debit card-based credit system is anything but paperless. Despite advent of the customer-not-present ("CNP") electronic telephone authorizations, the vast majority of customers conduct financial transactions across a credit network by using a single credit or debit card, signing a receipt or similar paper confirmation of the transaction, or perhaps conduct the transaction via a touch screen, indicating the amount of payment that may be charged against only a single payment instrument. Paper confirmations of the transactions must be collected and collated. The apparatus, system, and methods disclosed, illustrated, and claimed in this document obviate paper receipts, and offer the prospect of instant payment transactions across a credit network.

SUMMARY

The apparatus, system, and method disclosed in this document address the above-stated needs by providing a mobile wireless communications instrument. A computer, or data processor, is operatively connected to the mobile wireless communications instrument. In one aspect, the data processing system includes a plurality of user programmable sets of instruction executable by the data processing system for selectively and securely conducting financial transactions using the mobile wireless communications instrument.

In another aspect, the data processing system is capable of securely receiving, transmitting, and conducting financial transactions across a credit network. In another aspect, the data processing system is capable of transmitting and receiving programmable payment instructions in connection with not only one payment instrument, but in connection with a plurality of payment instruments, across a credit network. The mobile wireless financial device is also capable of allowing a user of the mobile wireless financial device to receive and transmit a wide variety of financial data across a wireless communications system.

The additional optimizations disclosed, illustrated and claimed in this document provide a mobile wireless financial instrument for substantially automatically selecting a payment instrument by including in the mobile wireless communications instrument one or more payment decision algorithms that are responsive to programmable preferences by the user of the mobile wireless financial instrument for selecting a payment instrument based on the context of a user's desire to effect a payment.

DETAILED DESCRIPTION

Definitions

Figure 1:
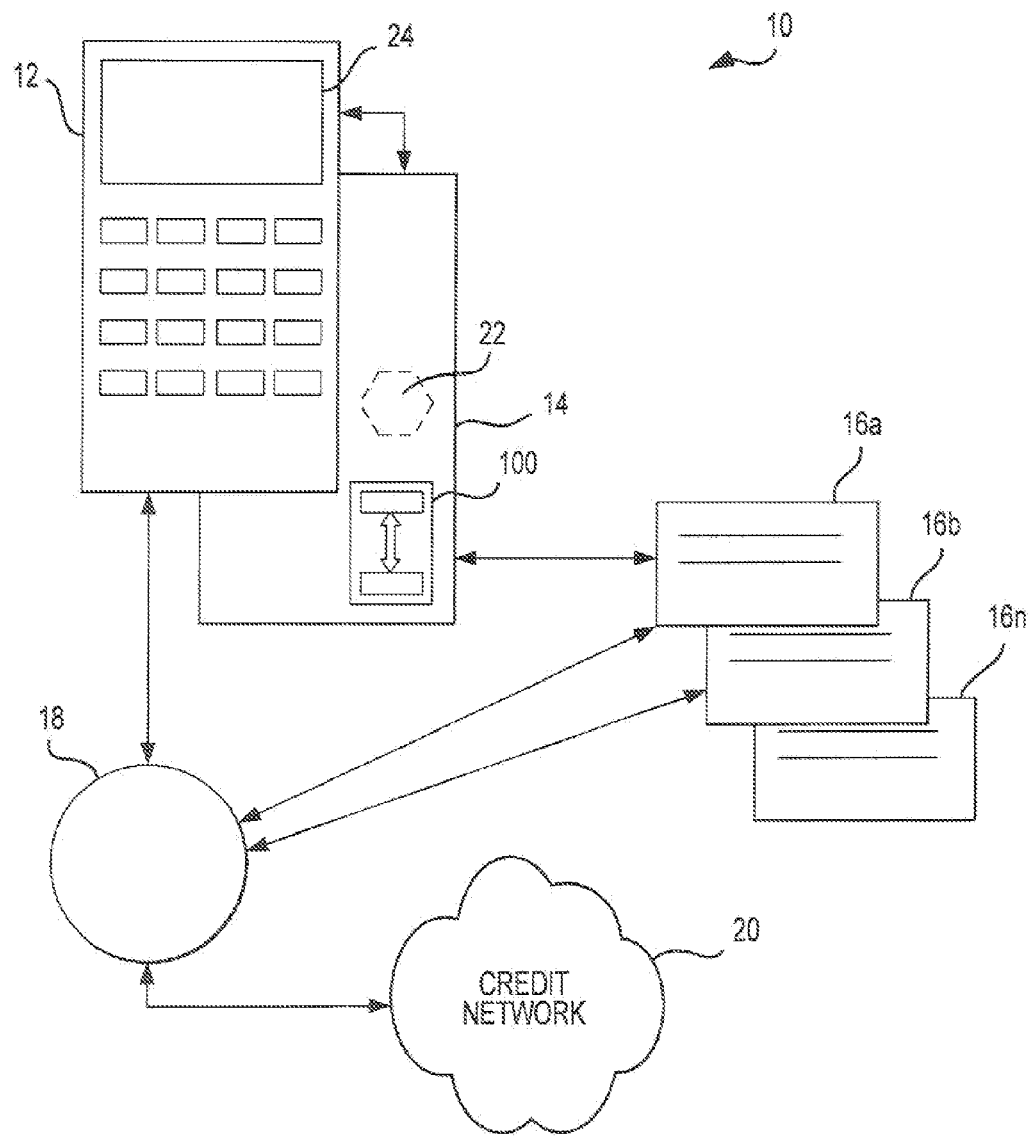
FIG. 1 is a schematic block diagram illustrating the point-of-sale device employing a mobile wireless communications instrument.

The terms "mobile wireless communications instrument," "portable wireless communications instrument," and "mobile wireless financial instrument," as used in this document mean at least a wireless communication instrument, such as but not limited to a cellular telephone, used in a wireless communications system that, in general, includes an array of operatively connected communication devices adapted to receive and transmit at least electromagnetic signals across the system without cables using infrared light and radio signals, and also includes a telecommunications system in which electromagnetic waves, rather than some form of wire, carry the signal over all or part of the communication path. The mobile wireless communications instrument may also receive and transmit signals from satellites, including satellites that are part of the Global Positioning System (GPS), Galileo, GLONASS, NAVSTAR, GNSS, a system that uses satellites from a combination of these systems, or any satellite positioning system subsequently developed (collectively referred to generally in this document as a Satellite Positioning System (SPS)). As used in this document, an SPS also includes pseudolite (pseudo-satellite) systems.

The term "instrument" in combination with the words "mobile wireless communications," means and includes at least a cellular telephone and a pager, a satellite telephone, a two-way pager, a personal digital assistant ("PDA") having wireless capabilities, a portable computer having wireless capabilities, home entertainment system control boxes, wireless local area networks, and any other type of wireless device having transmission capabilities that may also be one or more versions of a personal communications services device ("PCS") including time division multiple access ("TCMA"), a code division multiple access ("CDMA"), a global system for mobile ("GSM"), non-voice communications apparatus, and text transmission apparatus, among others.

The term "point-of-sale device" means at least a terminal or other device consisting of peer-to-peer near field communications devices, and ISO 14443-compliant contactless card, and ISO 18092-compliant FeliCa card among others. Thus, a point-of-sale device includes not only credit card and debit card readers (that may include touch screens), but also automatic and automated teller machines ("ATM's"), among others.

The term "credit network" means a national and/or worldwide system in which financial institutions, merchants, and public users are connectable. Credit networks were designed for use primarily with payment instruments. Payment instruments allow public users, or customers, to use, for example, a credit or debit card to purchase goods or services in substantially real time following authentication of the customer, and approval of the transaction by a financial institution. A user, or customer (in this document, "user" or "customer"), is issued a payment instrument such as a credit or debit card after an account has been approved by the credit provider, often a financial institution such as a bank, with which the user is able to make purchases from merchants who accept the credit, up to a pre-established limit. In addition, a "card association" often is included in the credit network, and includes among others VISA® and MasterCard® which act as gateways between a financial institution and issuer for authorizing and funding transactions, the issuer being a financial institution or other organization that issued the credit/debit card to the cardholder.

The flow of information and money among the various parties across a credit network, almost always through card associations, is known as the "interchange." The interchange includes a number of steps. The first step is authorization, in which the cardholder pays for a purchase, and the merchant submits the transaction to a financial institution that verifies, almost instantly, that the card number and transaction amount both are valid, and then processes the transaction for the cardholder. Another step includes "batching," which is the step by which a transaction is authorized and then stored in a batch that the merchant sends to the financial institution for later payment. Another step includes clearing and settlement, which is when the financial institution sends the transactions in a batch through the card association that debits the issuers for payment and credits the financial institution. Finally, there is the step of funding. Once the financial institution has been paid, the merchant receives payment.

The terms "financial data" and "financial information" mean at least any and all economics data related to matters of money and the markets. Financial data may be personal and/or commercial. Financial data and information is concerned with management of money, banking, credit, investments and assets.

The term "financial transaction" means at least the use of financial data and financial information used in exchange or transfer of goods, services or funds, generally based on contract, agreement, bargain and similar transactions using a payment instrument.

The term "payment instrument" means at least a credit card, a debit card, a contactless card, debit lines, debit coupons, and cash equivalents. Accordingly, the term "payment instrument" also includes the financial data and information associated with a physical credit instrument which may be stored in the mobile wireless communications instrument in addition to or separate from a physical credit instrument. A payment instrument thus includes not only conventional credit cards, but also debit cards, coupons, loyalty cards, stored value, and any of the range of cash equivalents available to a user.

The term "payment sum" means an amount of cash or cash equivalent debited to one or more payment instruments selected by a user of a mobile wireless communications instrument in accordance with this document to be debited for one or more payments in connection with a transaction conducted across a point-of-sale device.

The term "context" means a set of circumstances and conditions in which a user, as defined in this document, elects to debit one or more payment instruments in connection with a particular transaction requiring payment of a payment sum. The set of circumstances and conditions, the payment instruments, and the nature of the transaction requiring payment of a payment sum are included in one or more payment decision algorithms responsive to programmable preferences of a user.

The term "one or more databases for storing, receiving and transmitting financial data" means at least a mobile wireless communications instrument operatively connected to a computer.

The term "user" means a person or persons authorized to use the mobile wireless communications instrument and to access either a credit network to conduct and conclude payments in connection with one or more payment instruments, or one or more databases for storing, receiving and transmitting financial data.

The term "location" and "position" and "position determination" mean and refer to the physical and geographic location of an object including, for example, a mobile wireless communications instrument and a vendor's point-of-sale device, determined by any technique, technology, or system, or any combination of techniques, technologies, or systems, known or as yet unknown, for determining location and location parameters that may be received, stored, processed and transmitted by a mobile wireless communications system. Accordingly, the position determination system used in connection with the mobile wireless communications instrument of this document may be either a terrestrial system, or an SPS system as discussed below, or a combination of both.

The method and apparatus described in this document may be used with various satellite positioning systems ("SPS"), such as the United States Global Positioning System ("GPS"), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

Currently, such techniques and apparatus used for various wireless communication networks such as an SPS system include a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

The term "wireless communications network" means a wireless communications system adapted to communicate with one or more mobile wireless communications instruments, including not only the QUALCOMM® QSHOP™ system, but also any communications system capable of associating geographical location data with a mobile wireless communications instrument, a point-of-sale device in a merchant's store, and of transmitting between such geographic locations payment sums pertaining to a commercial transaction involving the sale and purchase of good and/or services, using SPS position-determination technology.

The term "payment sum" means not only the amount of a purchase sum or amount, in any vendor-acceptable currency, that the user desires to pay for the products or services of the vendor, but also any and all payment instructions in connection with the payment sum.

The term "data transmission subsystem" means a back-office subsystem of a wireless communications network including, but not limited to, the QUALCOMM Mobile Commerce Platform that includes QFLOW™.

The term "biometric data" means bionic and/or biometric features of a person, including, but not limited to, iris recognition data, finger prints, and similar biological information and/or features.

The word "exemplary" is used herein to mean "serving as an example, instance, or illustration." Any aspect described in this document as "exemplary" is not necessarily to be construed as preferred or advantageous over other aspects.

DESCRIPTION

The apparatus, system, and method disclosed in this document addresses the above stated needs by providing a mobile wireless communications instrument. A data processor or data processing system is operatively connected to the mobile wireless communications instrument. In one aspect, the data processing system includes a plurality of user programmable sets of instruction executable by the data processing system for selectively conducting financial transactions using the mobile wireless communications instrument. In another aspect, the data processing system is capable of securely receiving, storing, transmitting, and conducting a wide variety of financial transactions across a credit network. In another aspect, the data processing system is capable of receiving, storing, and transmitting programmable payment instructions in connection with not only one payment instrument, but in connection with a plurality of payment instruments.

More specifically, in at least one aspect of the apparatus, system, and method disclosed, illustrated and claimed in this document, a point-of-sale payment system 10 is provided that includes a portable, or mobile, wireless communications instrument 12, as illustrated in FIG. 1 schematically and diagrammatically. The mobile wireless communications instrument 12 is selected from the group of mobile wireless communications instruments consisting of cellular phones, communication apparatus providing personal communications services (PCS) including time division multiple access (TDMA), code division multiple access (CDMA) and global system for mobile (GSM), non-voice communication apparatus, text transmission apparatus, satellite telephones, two-way pagers, personal digital assistants, portable wireless computers, a wireless instrument specifically designed to implement financial data transactions, among others.

As also illustrated in FIG. 1, the point-of-sale payment system includes a computer 14. As shown, the computer 14 is operatively connected to the portable, or mobile, wireless communications instrument 12. In one aspect, the computer 14 also is housed in the portable wireless communications instrument 12. The computer 14 is adapted to transmit and receive programmable payment instructions in connection with one more payment instruments 16a-n. In operation, any and all data electronically or otherwise embedded in and on the one or more payment instruments 16a-n, as shown in FIG. 1, as well as any other data associated with a customer, a financial institution, and/or a card association, is stored in the computer 14 of the mobile wireless communications instrument 12 for use as further described in this document.

Figure 2:
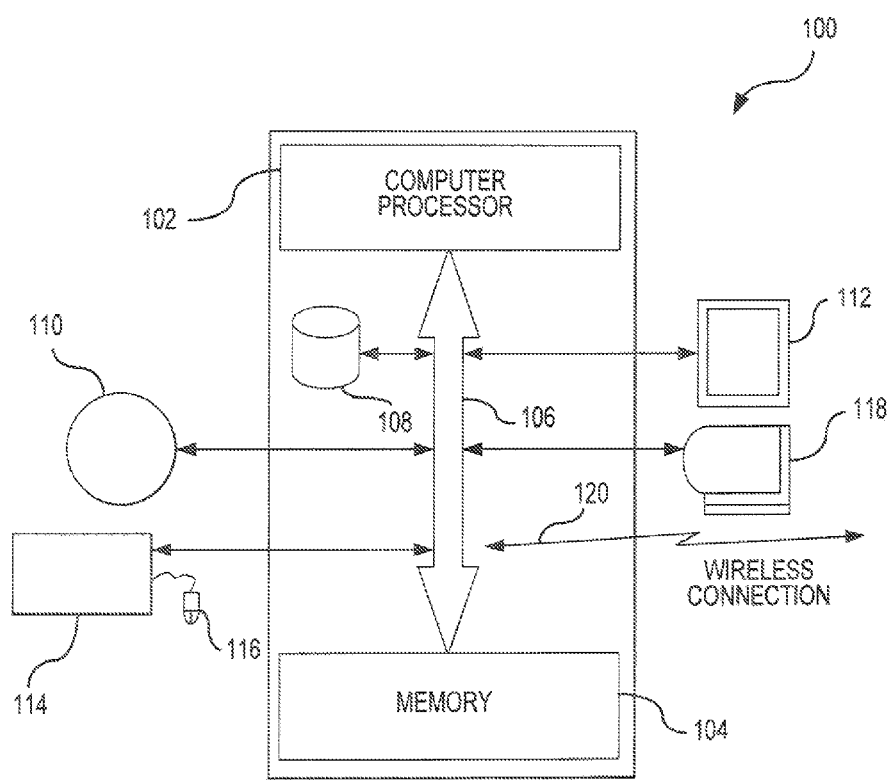
FIG. 2 is a schematic block diagram illustrating a version of the data processing system of the computer associated with the wireless communications instrument.

The computer of the mobile communications instrument 12 includes a data processing system 100 as illustrated in a non-exclusive example in the block diagram in FIG. 2. As shown, the data processing system 100 may include a variety of components to enable the mobile communications instrument 12 to send and receive data and information to a point-of-sale device 18, including a computer processor 102, memory 104, the computer processor and memory connected by a bus 106. Memory 104 is a relatively high-speed machine-readable medium and includes volatile memories such as DRAM, and SRAM, as well as non-volatile memories such as ROM, FLASH, EPROM, EEPROM, and bubble memory. Also connectable to the bus 106 are optional secondary storage 108, external storage 110, output devices such as a monitor 112 that may be mounted on the mobile wireless communications system 12, in optional configurations an input device such as a keyboard 114 with a mouse 116, and perhaps even a printer 118. Secondary storage 108 may include machine-readable media such as a hard disk drive, a magnetic drum, and a bubble memory. External storage 110 may include machine-readable media such as a floppy disk, a removable hard drive, a magnetic tape, CS-ROM, and even other computers, possibly connected via a communications line 120. The distinction between secondary storage 108 and external storage 110 is primarily for convenience in describing the invention. As such, a person skilled in the art will appreciate that there is substantial functional overlap between and among the components. Computer software and user programs can be stored in a software storage medium such as memory 104, secondary storage 108, and external storage 110. Executable versions of computer software can be read from a storage medium such as non-volatile memory, loaded for execution directly into volatile memory, executed directly out of non-volatile memory, or stored on the secondary storage 108 prior to loading into volatile memory for execution.

In addition, those skilled in the art also will appreciate that the various illustrative logical blocks, modules, circuits, and algorithm steps described in connection with the aspect of the invention disclosed in this document may be implemented as electronic hardware, computer software, or combination of both. To clearly illustrate this interchangeability of hardware and software, various illustrative and non-exclusive components, blocks, modules, circuits, and steps have been described in this document generally in terms of their functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed in this document may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices such as, in a non-exclusive example, a combination of a DSP and a microprocessor, a plurality of microprocessors, one or more microprocessors in conjunction with a DSP core, or any other such configuration.

The computer 14 of the wireless communications instrument 12 is capable of communicating with the point-of-sale device 18 in part due to use of a near-field communications system, or similar technology. In operation, the user brings the wireless communications instrument 12 adjacent the point-of-sale device 18 and, using keys or other means for transmitting signals and information, transmits instructions in connection with payment instruments 16*a-n* to the point-of-sale device 18 using one or more near-field communications systems.

So-called "near-field communication" (NFC) systems have become known, and standards for NFC systems have been ratified. In accordance with the standards, NFC systems are limited to a range of only about 10 cm and are capable of a bit transfer rate of 424 kilobits per second using a carrier frequency of 13.56 MHz. Similarly to radio frequency identification (RFID) systems, on which the new NFC standards are based, a principal function contemplated for NEC devices is the capacity to interrogate them in a passive mode in which they consume no power and to have a unique code, previously stored, rapidly and reliably returned in a manner which does not interfere with other wireless communications, and which minimizes or avoids interference from such other wireless communications whenever such an interrogation is made. Accordingly, NFC systems transmit information by inductive electromagnetic coupling in the radio frequency portion of the spectrum. The NFC standard also provides for software that enables nearly instantaneous peer-to-peer network setup. NFC devices thus effectively seek each other and establish a communication link between themselves in sharp contrast to, for example, so-called Bluetooth enabled devices in which, while also intended for short range peer-to-peer communications, setup procedures are complex and extended, largely to establish device configuration which is unnecessary in NFC systems. This networking facility is in sharp contrast to RFID systems which are set up in a master/slave relationship in which usually passive chips or transponders are read by relatively expensive, powered reader devices having a range of about two to five meters. NFC systems also differ from other types of known wireless communication systems such as so-called Wi-Fi systems that generally require an access hub. Further, NFC devices can be set to either an active or passive mode such that identification data can be sent even when the device is off and consuming no power. Even in an active mode, the range of NFC devices is so small that very little power is consumed. Accordingly, NFC devices have been implemented in single chips and chip sets for a wide variety of applications, and are appropriate for use in connection with the point-of-sale payment system 10 described in this document.

As also illustrated in FIG. 1, the point-of-sale payment system includes a point-of-sale device 18. The point-of-sale device 18 is operatively connectable, on demand, to the portable wireless communications instrument 12. The point-of-sale device 18 is adapted to receive and process payment data. More specifically, the point-of-sale device 18 is adapted to receive and process payment data across a credit network 20 to which the point-of-sale device 18 is operatively connectable. The point-of-sale device 18 may be a peer-to-peer near field communications device, an ISO 14443-compliant contactless card, and an ISO 18092-compliant FeliCa card, among others.

The point-of-sale payment system 10 illustrated in FIG. 1 also includes at least one algorithm 22 shown diagrammatically in FIG. 1. The algorithm 22 may be included in the computer 14. In one aspect, the at least on algorithm 22 is formulated to be responsive to a user's programmable preferences for payment from the one or more payment instruments 16*a-n*. The programmable preferences for payment may be presented to and viewed by the user on the mobile wireless communications instrument 12 as a range of selectable options and/or settings. As one non-exclusive example, as shown in FIG. 1, a monitor 24 may be mounted on the mobile wireless communications instrument, and the user may scroll through the range of selectable options and/or settings, selecting one or more options. Because payment algorithm 22 is programmable by the user, or may be selected from a range of selectable options and/or settings by the user, the point-of-sale payment system 10 allows a user to decide on personal strategies for making payments from one or more payment instruments 16*a-n*. The one more payment instruments 16*a-n* may include any combination or permutation of use of more than one payment instrument 16*a-n* that may include credit cards, debit cards, contactless cards, cash equivalents stored in the computer or on-line, and coupons, among others.

The point-of-sale payment 10 system illustrated in FIG. 1 also is capable of loading, displaying, and transmitting user financial information and data to prepare a range of financial data reports selected by the user of the mobile wireless communications instrument 12. For example, the user may store in the computer 14 a variety of personal or business financial reports such as, for example, a balance sheet, income statement, and similar reports. Such reports may be transmitted either across the credit network 20, to other databases and terminals in the discretion of the user.

Figure 3:
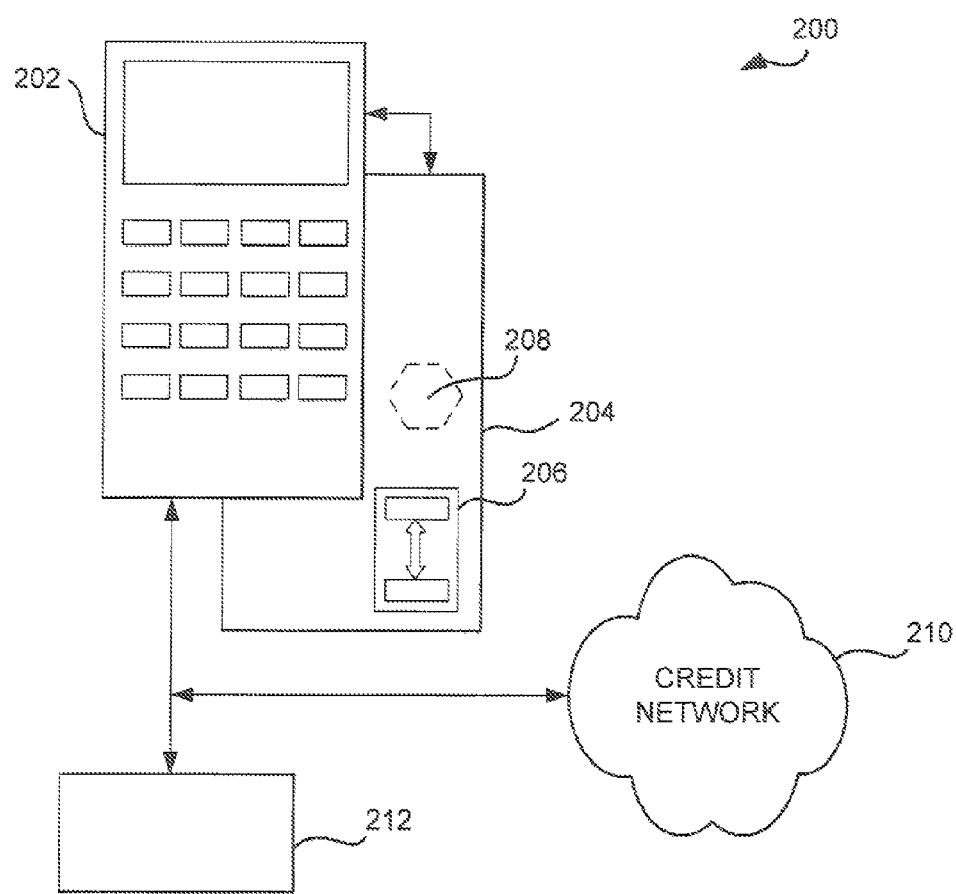
FIG. 3 is a schematic block diagram illustrating the financial data apparatus employing a mobile wireless communications instrument.

In another aspect of the apparatus, system, and method disclosed, illustrated and claimed in this document, as shown in FIG. 3, a financial data apparatus 200 is provided. As shown, the financial data apparatus 200 includes a mobile wireless communications instrument 202. The mobile wireless communications instrument 202 may be any of the optional mobile wireless communications instruments already described in this document.

As illustrated by cross-reference between FIGS. 2 and 3, in a computer 204 operatively connected to the mobile wireless communications system 202 is a data processing system 206. The data processing system 206 may include one or more of the functionalities and components of the data processing system 100 illustrated in FIG. 2. A wide array of financial data may be stored in a memory 104, 108, and/or 110 as illustrated by cross-reference between FIGS. 2 and 3.

To enable the financial data apparatus 200 to selectively conduct financial transactions using the mobile wireless communications instrument 202, a plurality of user programmable sets of instructions 208 executable by the data processing system 206 for selectively conducting financial transactions is provided. The plurality of user programmable sets of instructions 208 may be linked to any number of databases 212.

In addition, the financial data apparatus 200 includes means, both hardware and software, operatively connectable to the mobile wireless communications instrument 202 for securely receiving, transmitting, and concluding the financial transactions not only across a credit network 210, but also across any network of interconnected and interconnectable computers and databases 212.

As indicated, the apparatus and methods disclosed and claimed in the Parent Application have proven useful in a wide variety of applications and circumstances. The additional optimizations disclosed, illustrated and claimed in this document provide a mobile wireless financial instrument for substantially automatically selecting a payment instrument by including in the mobile wireless communications instrument one or more payment decision algorithms that are responsive to programmable preferences by the user of the mobile wireless financial instrument for selecting a payment instrument based on the context of a user's desire to effect a payment.

At least one problem in connection with allowing a consumer to effect payments across a credit network by charging a payment to one or more payment instruments of a user or owner of the payment instruments are the disparate locations in which a user may seek to use a mobile wireless financial instrument to effect financial transactions. That problem, among others, is solved by using position determination capabilities of a mobile wireless financial instrument in connection with the payment decision algorithms to establish the user's preference for one or more payment instruments depending on the user's location. A number of additional problems associated with selecting a payment instrument for debiting a payment sum include use of financial parameters, use of times and dates, and use of biometric data as one of a range of preferences that may be included in one or more decision algorithms in a data processing system for substantially automatically selecting one or more payment instruments from which to make a payment sum across a point-of-sale payment system.

More specifically, as illustrated by cross-reference between FIGS. 1-10, a mobile wireless communications instrument, also described in this document as a mobile wireless financial instrument, having position determination capabilities is shown. In addition, a mobile wireless financial instrument having position determination capabilities 402 is shown. The position determination system 402 may include an SPS system 404, or a terrestrial system 406. As will be appreciated by those of skill in the art, SPS system 404 and terrestrial system 406 may function either alone or in combination to provide position information, between the mobile wireless communications instrument 400 and the point-of-sale device 408, as well as across the credit network 410.

Figure 4:
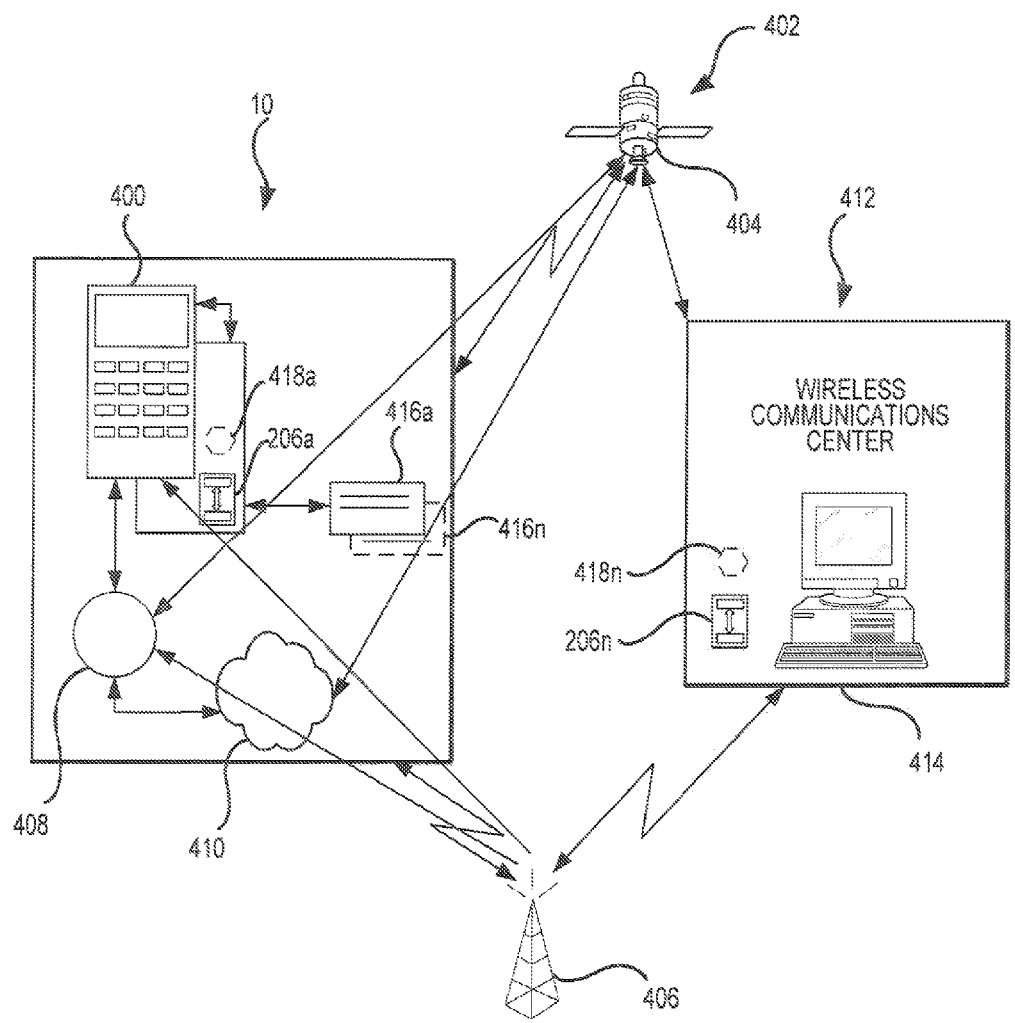
FIG. 4 is a block and schematic view of a system for effecting payment sums across a mobile wireless communications system.

As illustrated, the flow of data and information may also be enhanced by use of a wireless communications network 412 and a data transmission subsystem 414 to provide a payment sum by charging a payment instrument 416 that one or more payment decision algorithms 418 located in the mobile wireless communications instrument 400 selects from among a range of payment instruments 416 included on the mobile wireless communications instrument 400. Alternatively, or in addition, the one or more payment decision algorithms 418 may be located in the data transmission subsystem 414. As illustrated in FIG. 4, the one or more payment decision algorithms 418a-n are shown in broken lines only as an aid in description. Likewise, the payment instruments 416a-n also are shown diagrammatically in the form of a credit and/or debit card for illustrative purposes only. As indicated in this document, and appreciated by a person of skill in the art, the payment instruments 416a-n, the term "payment instrument" means not only a physical credit card, a debit card, contactless card, debit lines, debit coupons, and cash equivalents, but also includes merely the financial data and information associated with a physical instrument which may be stored in the mobile wireless communications instrument, and used in connection with the one or more payment decision algorithms 418a-n, to transmit a payment sum across at least a credit network.

In operation, as illustrated by cross-reference between FIGS. 4-10, one aspect of the invention disclosed, illustrated and claimed in this document, shows a point-of-sale payment system. The point of sale payment system 10 uses a mobile wireless financial instrument 400 for automatically selecting a payment instrument 416a-n for sending a payment sum across a mobile wireless communications system 412 and/or a credit network 410. The mobile wireless financial instrument 400 for automatically selecting a payment instrument 416a-n includes at least one mobile wireless communications instrument 400. In one aspect, the mobile wireless communications instrument 400 is a cellphone. However, as a person skilled in the art will appreciate, use of a cellphone is not a limitation of the mobile wireless financial instrument for automatically selecting a payment instrument. The at least one mobile wireless communications instrument 400 has at least the capability to receive, store, process and transmit a wide variety of data and information. The data and information may include a similarly wide variety of financial data.

The mobile wireless communications instrument 400 is operatively connectable to a number of other wireless apparatus, systems, and networks described in this document. For example, the wireless communications network may be operatively connectable to a data transmission subsystem 414. The data transmission subsystem 414 also is capable of receiving, storing, processing and transmitting data across the wireless communications network 412.

As illustrated perhaps best by cross-reference between FIGS. 2-4, the mobile wireless financial instrument 400 for automatically selecting a payment instrument 416a-n also includes a data processing system 206. In one aspect of the mobile wireless financial instrument 400 for automatically selecting a payment instrument 416a-n, the data processing system 206 is housed in the mobile wireless communications instrument 400. In another aspect of the mobile wireless financial instrument 400 for automatically selecting a payment instrument 416a-n, the data processing system 206 may be located in the data transmission subsystem 414. In yet another aspect of the mobile wireless financial instrument 400 for automatically selecting a payment instrument 416a-n, the data processing system 206 may be located in either or both of the mobile wireless financial instrument 400 and/or data transmission subsystem 414. The data processing system is capable of receiving, storing, processing, and transmitting programmable payment instructions in connection with one more payment instruments 416a-n.

As also illustrated in FIG. 4, a point-of-sale device 408 is operatively connectable to the mobile wireless communications instrument 400. The point-of-sale device 408 is capable of receiving and processing payment data. As illustrated in FIG. 4, the point-of-sale device 408 also may be operatively connected to a credit network 410 for effecting payment of a payment sum across the credit network 410.

As illustrated in FIG. 4, the data processing system 206 includes one or more payment decision algorithms 418. Each of the one or more payment decision algorithms 418 is responsive to programmable preferences of a user of the mobile wireless communications instrument 400. The term "programmable preferences" include a wide variety of choices available to the user. Among the variety of choices is automatic selection of a payment instrument 416a-n for transmitting a payment sum across at least the point-of-sale payment device 408.

Thus, in one non-exclusive aspect of the mobile wireless financial instrument 400 for automatically selecting a payment instrument 416a-n for sending a payment sum across a mobile wireless communications system 412, the one or more payment decision algorithms 418a-n is responsive to programmable preferences of a user in connection with location information. As illustrated in FIGS. 4-7, the location information is supplied by a position determination system 402. The location information provided across the position determination system 402 is used to identify which of a plurality of payment instruments 416*a-n* is preferred by the user for a payment sum directed to a point-of-sale device 408. The position determination system 402 is operatively connectable to the data processing system 206 of the wireless communications instrument 400, to the wireless communications network 412, and, if used, the data transmission subsystem 414.

Figure 8:
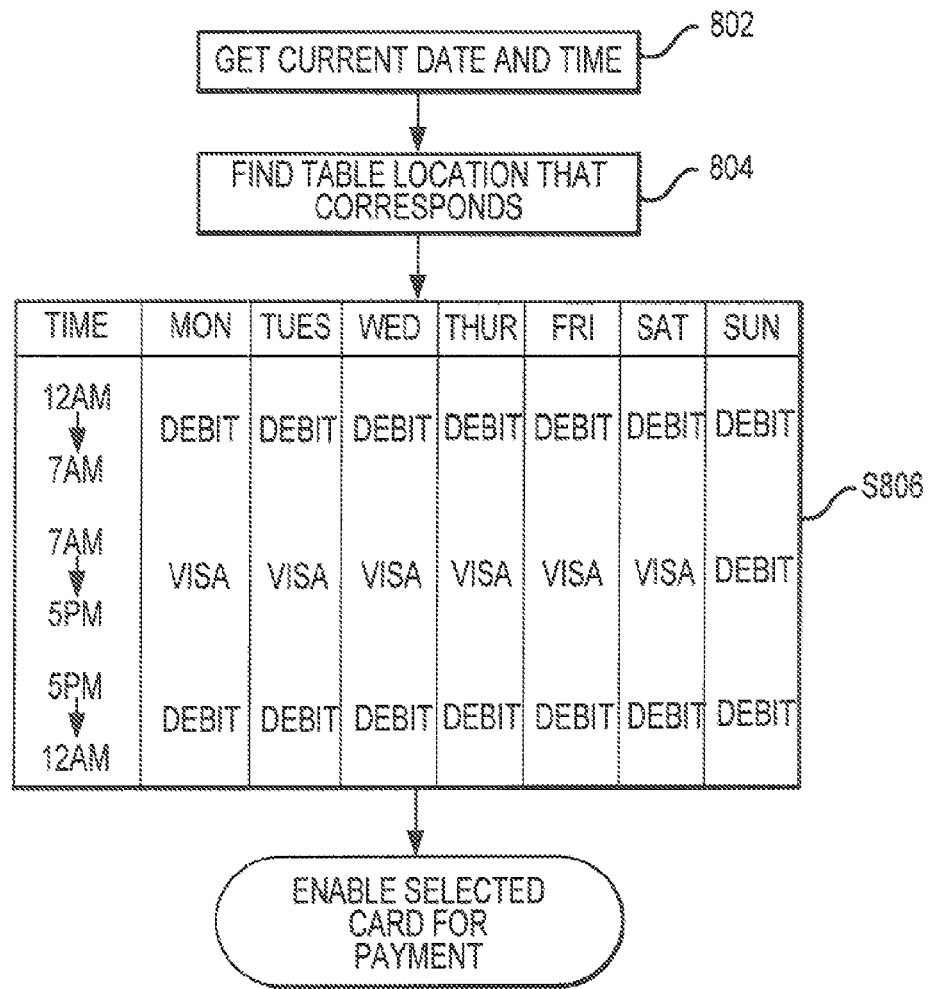
FIG. 8 is a flow chart illustrating one aspect of use of a date and a time for selecting a payment instrument.

In another aspect of the mobile wireless financial instrument for automatically selecting a payment instrument, as illustrated in FIG. 8, the one or more payment decision algorithms 418*a-n* responsive to programmable preferences of a user of the mobile wireless communications instrument 400 includes one or more preferences based on the date on which a payment sum is to be transferred across the point-of-sale payment system 10.

Figure 9:
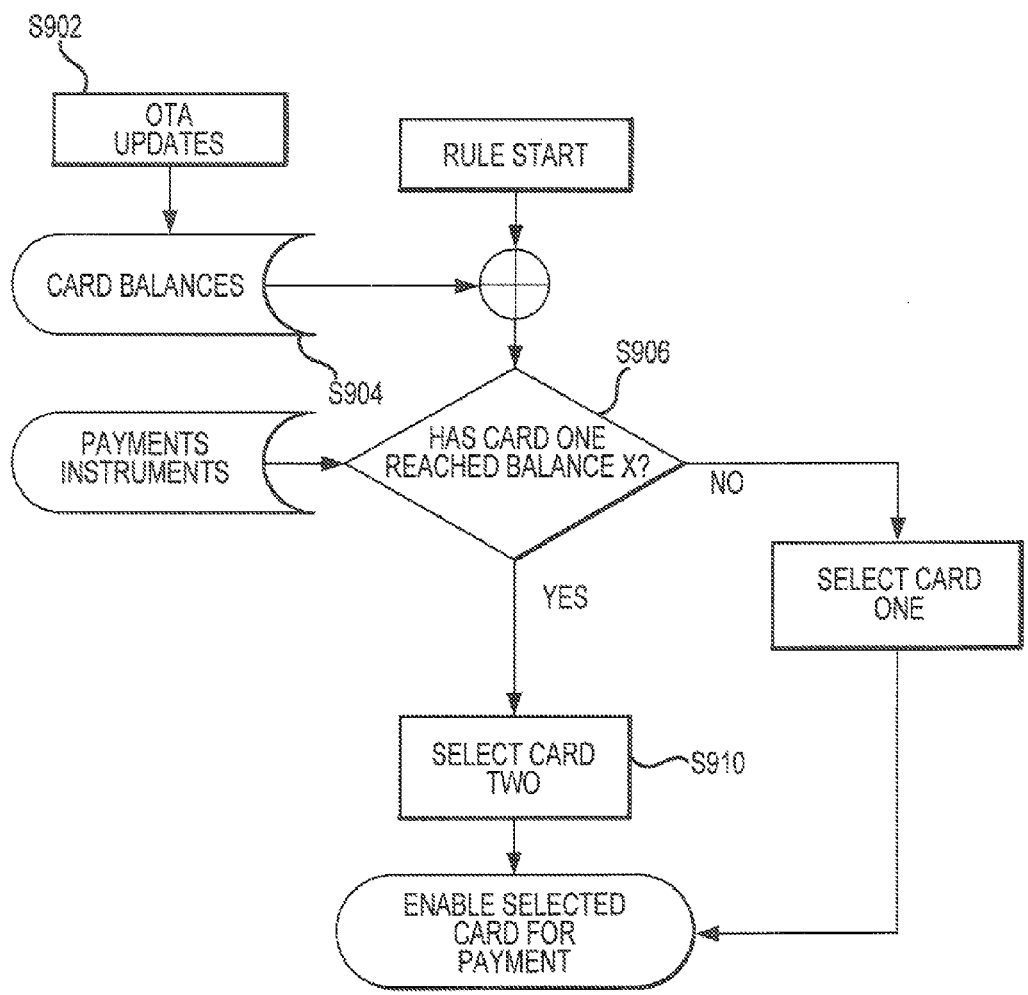
FIG. 9 is a flow chart illustrating one aspect of use of financial parameters for selecting a payment instrument.

In yet another aspect of mobile wireless financial instrument for automatically selecting a payment instrument, as illustrated in FIG. 9, the one or more payment decision algorithms 418*a-n* responsive to programmable preferences of a user of the mobile wireless communications instrument 400 includes one or more preferences based on the time at which a payment sum is to be transferred across the point-of-sale payment system 10.

Yet another aspect of the mobile wireless financial instrument 400 for automatically selecting a payment instrument 416*a-n*, as illustrated in FIG. 9, the one or more payment decision algorithms 418*a-n* responsive to programmable preferences of a user of the mobile wireless communications instrument 400 includes one or more preferences based on biometric data associated with the user of the mobile wireless communications instrument.

Figure 10:
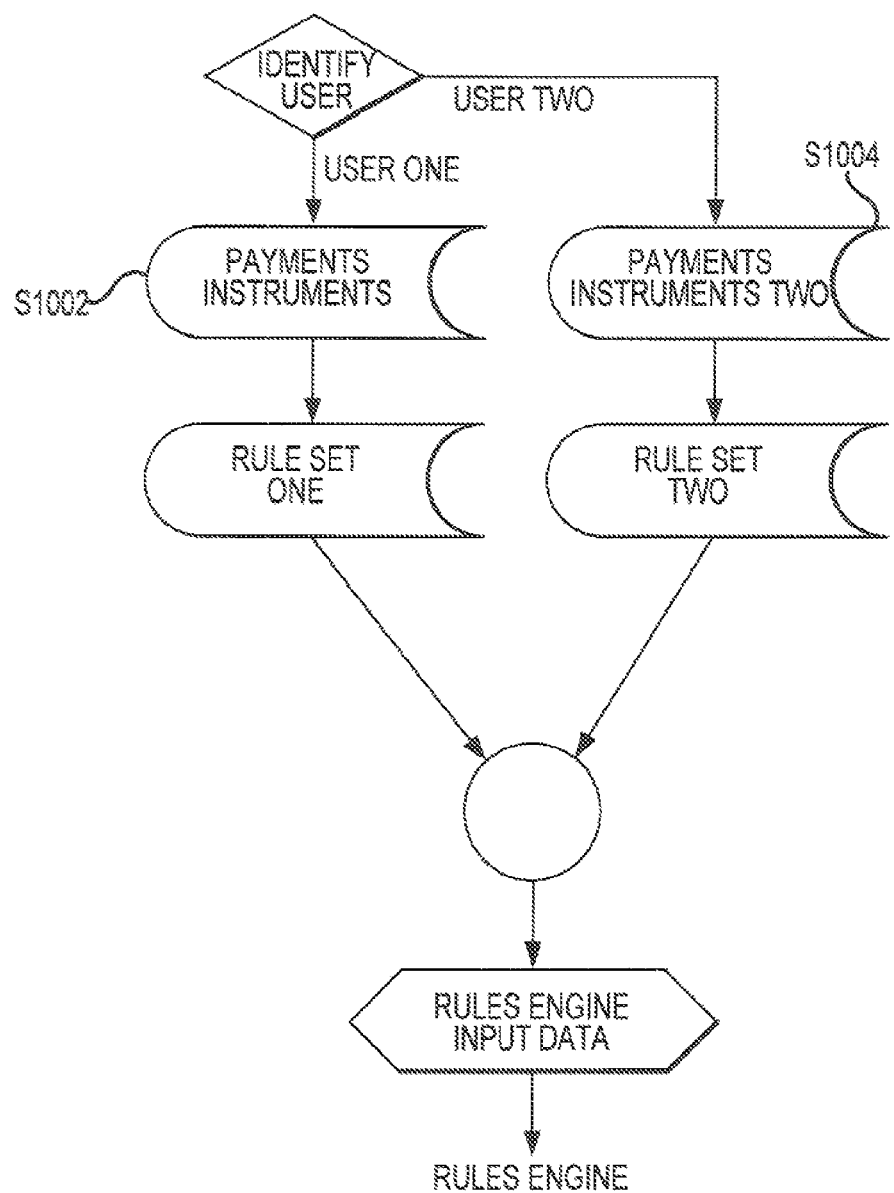
FIG. 10 is a flow chart illustrating one aspect of use of biometric data for selecting a payment instrument.

Another aspect of the mobile wireless financial instrument for automatically selecting a payment instrument, as illustrated in FIG. 10, the one or more payment decision algorithms 418*a-n* responsive to programmable preferences of a user of the mobile wireless communications instrument 400 includes one or more preferences based on prior historical data in connection with use of the one or more payment instruments.

Likewise, the mobile wireless financial instrument 400 for automatically selecting a payment instrument 418*a-n*, and the one or more payment decision algorithms 418*a-n*, are also responsive to identification of the point-of-sale device 408.

The one or more payment decision algorithms 418*a-n* responsive to programmable preferences of a user of the mobile wireless communications instrument 400 also includes the capability of eliminating at least one of the one or more payment instruments 418*a-n* based on information transmitted to the mobile wireless communications instrument from the point-of-sale device 408.

Figure 5:
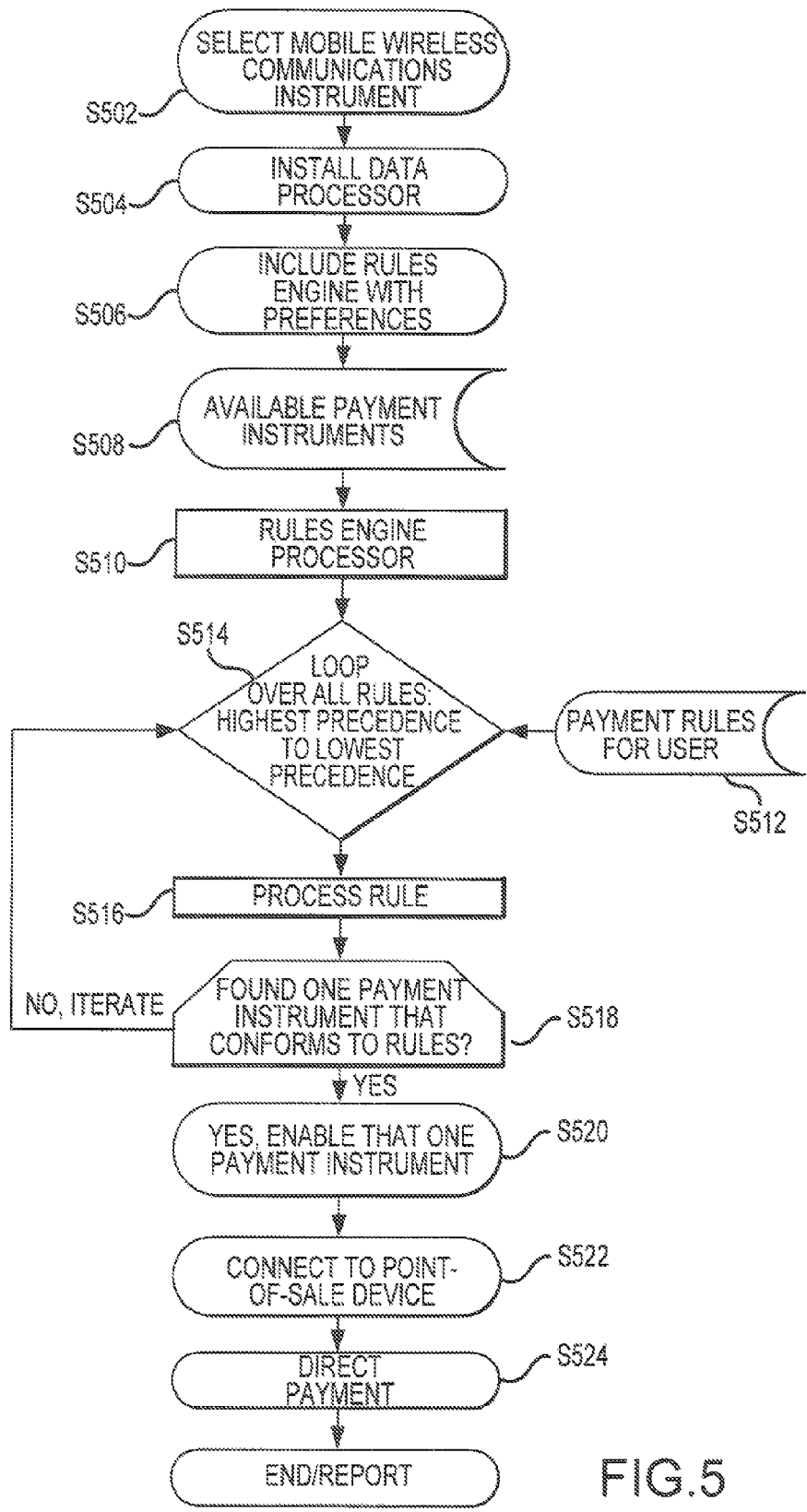
FIG. 5 is a flow chart illustrating a general use of a rules engine for selecting a payment instrument.

Referring now to FIG. 5, a method of substantially automatically selecting a payment instrument 418*a-n* for use in effecting a payment sum is summarized in a flowchart included as an aid in describing the steps of the method. The steps are as follows. As shown, the method includes step S502 of selecting a mobile wireless communications instrument 400. Step S504 recites installing a data processor in the mobile wireless communications instrument. Features and capabilities of the data processor are described in this document and illustrated by reference to FIGS. 2-4. As also illustrated in FIG. 5, step S506 is directed to installing in the data processor a programmable rules engine. The programmable rules engine includes, among other capabilities, a range of possible preferences applicable by a user of the mobile wireless communications instrument 400 for selecting a single payment instrument 416 or selecting a payment instrument from among a plurality of payment instruments 416*a-n*. In planning to make purchases, for example, a user of the mobile wireless communications instrument identifies in step S508 a range of selected preferences from among the range of possible preferences. The range of preferences may include, but are not limited to, one or more credit cards, debit cards, loyalty cards, coupons, stored values, among other possibilities (in this document, "payment instruments"). That data is included in the programmable rules engine. An order of priority may be established by the user among the preferences in connection with the payment instruments as desired by a user in a particular context.

At step S510, the data processor and the rules engine are shown as operatively connected, and at step S512 the user of the mobile wireless communications instrument 400 has selected one or more preferences from a menu of preferences. The user, in the example of FIG. 5, has indicated at step S512 a range of preferences for a plurality of payment instruments 416*a-n*, and instructed selection of a plurality of payment instruments 416*a-n* based on a rule such a the geographic location of the mobile wireless communications instrument 400. Thus, in the non-exclusive example illustrated at steps S514 through S518, the one or more payment decision algorithms 418*a-n* is prepared to enable payment from one or more payment instruments 416*a-n* based on location of either the mobile wireless communications instrument 400 and/or the point-of-sale device 408. At step S520 the one or more payment decision algorithms 418*a-n* enables the payment when, at step S522, the user operatively connects the mobile wireless communications instrument 400 and/or the point-of-sale device 408. At step 524 the user may authorize the payment sum using any of a number of payment instructions acceptable to the point-of-sale device 408, and well known to a person skilled in the art. Steps S502 through S524 may be repeated in a subsequent context.

Figure 6:
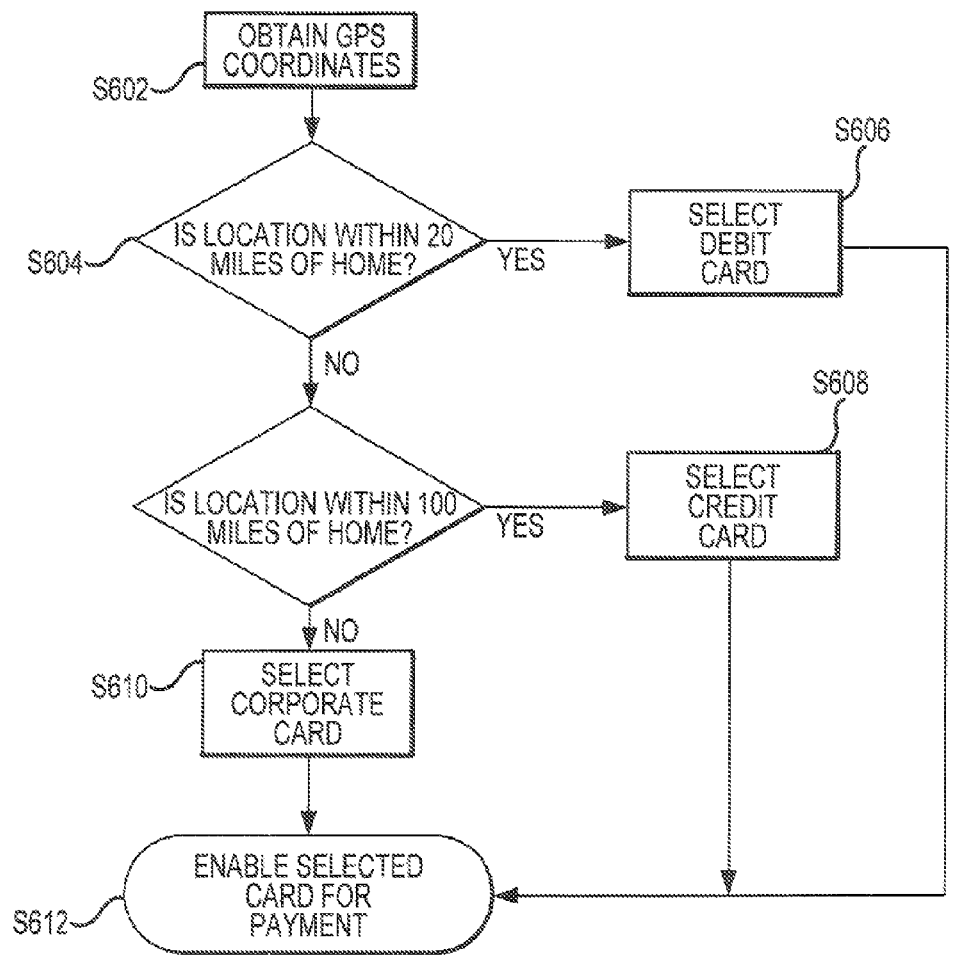
FIG. 6 is a flow chart illustrating one aspect of use of a location determination system for selecting a payment instrument.

As illustrated in FIG. 6, an example, one among many, of how the method of substantially automatically selecting a payment instrument for use in effecting a payment may be implemented, is illustrated. At step S602, the location determination system illustrated in FIG. 4 is used to determine the coordinates of the mobile wireless communications instrument 400. Based on a user's preference, the user may determine at step S604 that the user wants the method of substantially automatically selecting a payment instrument to be responsive to a location that is within 20 miles of the user's home. If that step is satisfied, at step S606 the programmable rules engine would select, for example, a user's debit card. Alternatively, at step S608, if the user's mobile wireless communications instrument 400 is within 100 miles of the user's home, the programmable rules engine would select, for example, a user's credit card. At step S610, if the programmable rules engine determines that the user is in excess of 100 miles from home, the assumption is that the user is traveling for business purposes, so the programmable rules engine would select, for example, a business credit card. As a person of skill in the art will appreciate, any number of combinations and permutations of location and distance may be used to identify and select from among the range of possible preferences one or more preferences desired by a user for use in a particular context, and to select a payment instrument at step S612.

Figure 7:
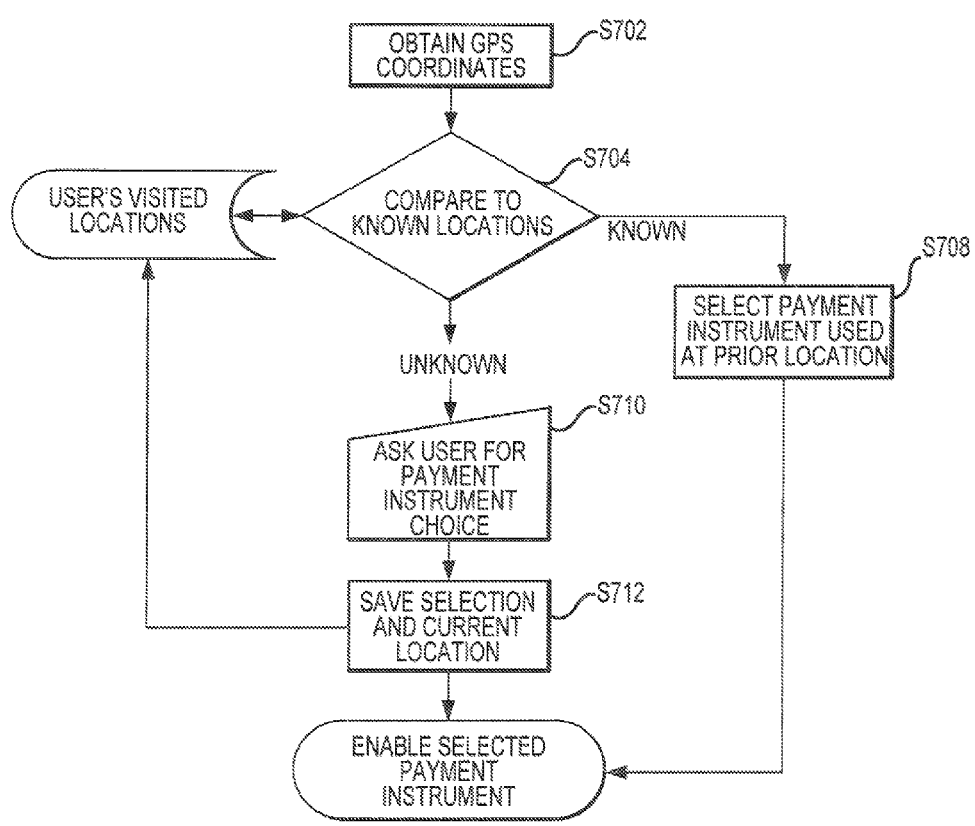
FIG. 7 is a flow chart illustrating another aspect of use of a location determination system for selecting a payment instrument.

For example, as illustrated in FIG. 7, a method of substantially automatically selecting a payment instrument 416*a-n* for use in effecting a payment is shown. At step S702, the range of preferences provided by the programmable rules engine would include geographic coordinates of the user's mobile wireless communications instrument. At step S704, one of the range of preferences in the programmable rules engine is to compare those coordinates with known locations or, alternatively, at step S706, to determine if the location is an unknown location. If a known location, then at step S708 the programmable rules engine would select the same payment instrument used at the same location previously. Alternatively, if the location is unknown, at step S710 the programmable rules engine would ask for instructions from the user about a preference for a payment instrument to use. If known or unknown, the location data can automatically be saved in the programmable rules engine as historical data for future use, as shown at step S712.

Likewise, as a person skilled in the art will appreciate, the programmable rules engine may include the capabilities of ranking preferences in descending order for application to a particular context, matching the ranking of preferences with the particular context, and choosing one or more payment instruments for use in the particular context.

In another aspect of the method of substantially automatically selecting a payment instrument 416a-n for use in effecting a payment, as illustrated in FIG. 8, additional enhancements are achieved by including in the rules engine a range of preferences based on a date and a time of a user's selection of a payment instrument 416 from among the plurality of payment instruments 416a-n. At step 802 the current data and time are determined. At step 804, the programmable rules engine substantially automatically determines, either in combination with location data, or without location data, the preference for a payment instrument 416 desired by a user. For example, a user may elect to use different payment instruments 416a-n depending on work or non-work hours, a preference that may change, as indicated at step S806, depending on the date of the week.

In yet another aspect of the method of substantially automatically selecting a payment instrument for use in effecting a payment, as illustrated in FIG. 9, additional enhancements are achieved by including in the programmable rules engine a range of preferences based on one or more financial parameters chosen by a user for selecting a payment instrument 416 from among the plurality of payment instruments 416a-n. For example, the programmable rules engine may include a range of preferences based on remaining credit balances associated with a payment instrument. Thus, at step S902 the user's mobile wireless communications instrument 400 is automatically updated with current account information, including at step S904, for example, a card balance. If, at step S906, the card has reached its balance, at step S906 a different payment instrument is selected. Alternatively, by combining step S906 with step S910, two different payment instruments might be debited with a payment sum.

In yet another aspect of the method of substantially automatically selecting a payment instrument for use in effecting a payment, as illustrated in FIG. 10, additional enhancements are achieved by including in the programmable rules engine a range of preferences based on biometric data for identifying one or more users of the mobile wireless communications instrument for selecting a payment instrument from among a plurality of payment instruments. This feature might be useful, for example, where the user of the mobile wireless communications instrument wants to allow another person to use the mobile wireless communications instrument for purposes of debiting one or more payment instruments. Preferences may be altered, as shown at step S1002 and step S1004 to either limit a second user to use of a specific payment instrument or to allow use of a plurality of payment instruments.

As a person of skill in the art will appreciate, all of the features discussed in this document may be used alone or in combination with one of more preferences of the programmable rules engine.

In operation, the unique advantages and features disclosed, illustrated and claimed in this document are obtained by selecting a mobile wireless communications instrument. A data processing system is installed in the mobile wireless communications instrument. The data processing system includes the payment decision algorithm. The payment decision algorithm is programmable to be responsive to preferences of a user of the mobile wireless communications instrument, including, but not limited to, automatically identifying and selecting a payment instrument to be used to make a payment sum. Thus, the payment decision algorithm is capable of choosing from among a range of programmable preferences the unique preferences of a user regarding which payment instrument or instruments to use.

Those of skill in the art also will appreciate that the method steps claimed in this document can be interchanged and are interchangeable without departing from the scope of the invention.

Those of skill in the art also will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosed aspects is provided to enable any person skilled in the art to make or use the present invention. Various modifications to these embodiments will be readily apparent to those skilled in the art, and the generic principles defined in this document may be applied to other embodiments without departing from the spirit or scope of the invention. Thus, the present invention is not intended to be limited to the aspects shown in this document, but is to be accorded the widest scope consistent with the principles and novel features disclosed in this document.

What is claimed is:

1. A method comprising:
  receiving, by a mobile wireless communications instrument from a position determination system of the mobile wireless communications instrument, location information that comprises a location of the mobile wireless communications instrument;
  selecting, by the mobile wireless communications instrument, one or more user preferences of a user from a plurality of programmable user preferences stored in the mobile wireless communications instrument; and
  securely conducting a financial transaction, by the mobile wireless communications instrument, based on one or more payment instruments of a plurality of payment instruments automatically selected by the mobile wireless communications instrument based on the selected one or more user preferences and the received location information.

2. The method of claim 1, wherein securely conducting the financial transaction further comprising transmitting data from the mobile wireless communications instrument to a device across a wireless communications network, wherein the data identifies the selected one or more payment instruments.

3. The method of claim 2, wherein the device comprises one or more of a point-of-sale device, a terminal, a peer-to-peer near field communications device, a contactless card, a credit card reader, a debit card reader, and an automated teller machine.

4. The method of claim 1, further comprising selecting one or more payment instruments using the selected user preferences and the received location information and a ranking of the selected one or more user preferences.

5. The method of claim 2, wherein transmitting the data to the device across the wireless communications network includes connecting to a data transmission subsystem.

6. The method of claim 2, wherein transmitting the data to the device across the wireless communications network comprises making the payment from the one or more payment instruments of the plurality of payment instruments identified by the data.

7. The method of claim 2, wherein transmitting the data to the device across the wireless communications network includes excluding one or more payment instruments of the plurality of payment instruments based on information transmitted to the mobile wireless communications instrument from the device.

8. The method of claim 1, further comprising selecting one or more payment instruments using the selected user preferences and the received location information, and one or more of date and time information, biometric data associated with a user of the mobile wireless communications instrument, prior historical data in connection with use of the one or more payment instruments, and a ranking of the one or more payment instruments.

9. The method of claim 1, further comprising:
determining that the location is an unknown location; and
in response to determining that the location is an unknown location, asking the user which payment instrument of the plurality of payment instruments to use at the location.

10. The method of claim 1, further comprising recording the location of the mobile wireless communications instrument.

11. The method of claim 1, wherein the mobile wireless communications instrument is a cellular phone.

12. A mobile wireless communications instrument comprising:
a housing;
a position determination system positioned within the housing; and
a data processing system positioned within the housing and comprising:
a memory;
a bus coupled to the memory; and
a processor coupled to the bus, wherein the processor is configured with processor-executable instructions to perform operations for securely conducting a financial transaction using the mobile wireless communications instrument, the operations comprising:
sending data to a device, receiving data from the device, and storing the received data, wherein the data is associated with one or more payment instruments;
receiving location information that comprises the location of the mobile wireless communications instrument from the position determination system; and
automatically identifying one or more payment instruments of a plurality of payment instruments for securely conducting the financial transaction based in part on the received location information and one or more preferences of a user.

13. The mobile wireless communications instrument of claim 12, wherein the data processing system communicates with a wireless communications network.

14. The mobile wireless communications instrument of claim 13, wherein the wireless communications network is a credit network.

15. The mobile wireless communications instrument of claim 12, wherein the device comprises one or more of a point-of-sale device, a terminal, a peer-to-peer near field communications device, a contactless card, a credit card reader, a debit card reader, and an automated teller machine.

16. The mobile wireless communications instrument of claim 12, wherein the processor is further configured with processor-executable instructions to perform operations comprising excluding one or more payment instruments of the plurality of payment instruments based on information transmitted to the mobile wireless communications instrument from the device.

17. The mobile wireless communications instrument of claim 12, wherein identifying one or more payment instruments of the plurality of payment instruments for securely conducting the financial transaction based in part on the received location information and one or more preferences of the user comprises identifying one or more payment instruments that are preferred by the user based in part on the received location information and one or more preferences of the user, and one or more of date and time information, biometric data associated with the user of the mobile wireless communications instrument, prior historical data in connection with use of the one or more payment instruments, and a ranking of the one or more payment instruments.

18. The mobile wireless communications instrument of claim 12, wherein the identified one or more payment instruments comprise one or more of credit cards, debit cards, contactless cards, debit lines, coupons, loyalty cards, and stored value cards.

19. The mobile wireless communications instrument of claim 12, wherein the processor is further configured with processor-executable instructions to perform operations comprising recording the location of the mobile wireless communications instrument.

20. The mobile wireless communications instrument of claim 12, wherein the mobile wireless communications instrument is a cellular phone.

21. An apparatus comprising:
a mobile wireless communications instrument;
a position determination system positioned within and coupled to the mobile wireless communications instrument and configured to provide a location of the mobile wireless communications instrument; and
a data processing system positioned within and coupled to the mobile wireless communications instrument, wherein the data processing system is configured to automatically identify one or more payment instruments of a plurality of payment instruments to conduct a secure financial transaction, based in part on the provided location and one or more preferences of a user.

22. The apparatus of claim 21, wherein the data processing system is further configured to transmit data to a device across a wireless communications network, wherein the data identifies the one or more payment instruments of the plurality of payment instruments.

23. The apparatus of claim 22, wherein the device comprises one or more of a point-of-sale device, a terminal, a peer-to-peer near field communications device, a contactless card, a credit card reader, a debit card reader, and an automated teller machine.

24. The apparatus of claim 22, wherein the wireless communications network is a credit network.

25. The apparatus of claim 22, wherein the data processing system is further configured to make a payment from the one or more payment instruments of the plurality of payment instruments identified by the data.

26. The apparatus of claim 22, wherein the data processing system is further configured to exclude one or more payment instruments of the plurality of payment instruments based on information transmitted to the mobile wireless communications instrument from the device.

27. The apparatus of claim 21, wherein the data processing system is further configured to identify one or more payment instruments based in part on the provided location and one or more preferences of the user, and one or more of date and time information, biometric data associated with the user of the mobile wireless communications instrument, prior historical data in connection with use of the one or more payment instruments, and a ranking of the one or more payment instruments.

28. The apparatus of claim 21, wherein the selected one or more payment instruments comprise one or more of credit cards, debit cards, contactless cards, debit lines, coupons, loyalty cards, and stored value cards.

29. The apparatus of claim 21, wherein the data processing system is further configured to record the location of the mobile wireless communications instrument.

30. The apparatus of claim 21, wherein the mobile wireless communications instrument is a cellular phone.

31. A non-transitory processor readable storage medium having stored thereon processor-executable instructions configured to cause a mobile wireless communications instrument processor to perform operations comprising:
   receiving, by the mobile wireless communications instrument from a position determination system of the mobile wireless communications instrument, location information that comprises a location of the mobile wireless communications instrument;
   selecting, by the mobile wireless communications instrument, one or more user preferences of a user from a plurality of programmable user preferences stored in the mobile wireless communications instrument; and
   securely conducting a financial transaction, by the mobile wireless communications instrument, based on one or more payment instruments of a plurality of payment instruments automatically selected by the mobile wireless communications instrument based on the selected one or more user preferences and the received location information.

32. The non-transitory processor readable storage medium of claim 31, wherein the stored processor-executable instructions are further configured to cause the mobile wireless communications instrument processor to perform operations comprising transmitting data from the mobile wireless communications instrument to a device across a wireless communications network, wherein the data identifies the selected one or more payment instruments.

33. The non-transitory processor readable storage medium of claim 32, wherein the device comprises one or more of a point-of-sale device, a terminal, a peer-to-peer near field communications device, a contactless card, a credit card reader, a debit card reader, and an automated teller machine.

34. The non-transitory processor readable storage medium of claim 32, wherein the wireless communications network is a credit network.

35. The non-transitory processor readable storage medium of claim 32, wherein transmitting the data to the device across the wireless communications network includes connecting to a data transmission subsystem.

36. The non-transitory processor readable storage medium of claim 32, wherein transmitting the data to the device across the wireless communications network for securely conducting the financial transaction comprises making a payment from the one or more payment instruments of the plurality of payment instruments identified by the data.

37. The non-transitory processor readable storage medium of claim 32, wherein transmitting the data to the device across the wireless communications network includes excluding one or more payment instruments of the plurality of payment instruments based on information transmitted to the mobile wireless communications instrument from the device.

38. The non-transitory processor readable storage medium of claim 31, wherein securely conducting the financial transaction further comprises selecting one or more payment instruments using the selected user preferences and the received location information, and one or more of date and time information, biometric data associated with a user of the mobile wireless communications instrument, prior historical data in connection with use of the one or more payment instruments, and a ranking of the one or more payment instruments.

39. The non-transitory processor readable storage medium of claim 31, wherein the selected one or more payment instruments comprise one or more of credit cards, debit cards, contactless cards, debit lines, coupons, loyalty cards, and stored value cards.

40. The non-transitory processor readable storage medium of claim 31, wherein the stored processor-executable instructions are further configured to cause the mobile wireless communications instrument processor to perform operations further comprising recording the location of the mobile wireless communications instrument.

41. The non-transitory processor readable storage medium of claim 31, wherein the mobile wireless communications instrument is a cellular phone.

42. An apparatus comprising:
   means for receiving, by a mobile wireless communications instrument, location information that comprises a location of the mobile wireless communications instrument;
   means for selecting, by the mobile wireless communications instrument, one or more user preferences of a user from a plurality of programmable user preferences stored in the mobile wireless communications instrument; and
   means for securely conducting a financial transaction, by the mobile wireless communications instrument, based on one or more payment instruments of a plurality of payment instruments automatically selected based on the selected one or more user preferences and the received location information.

43. The apparatus of claim 42, further comprising means for transmitting data from the mobile wireless communications instrument to a device across a wireless communications network, wherein the data identifies the selected one or more payment instruments.

44. The apparatus of claim 43, wherein the device comprises one or more of a point-of-sale device, a terminal, a peer-to-peer near field communications device, a contactless card, a credit card reader, a debit card reader, and an automated teller machine.

45. The apparatus of claim 43, wherein the wireless communications network is a credit network.

46. The apparatus of claim 43, wherein the means for transmitting the data to the device across the wireless communications network includes means for connecting to a data transmission subsystem.

47. The apparatus of claim 43, wherein the means for transmitting the data to the device across the wireless communications network for securely conducting the financial transaction comprises means for making a payment from the one or more payment instruments of the plurality of payment instruments identified by the data.

48. The apparatus of claim 43, wherein means for transmitting the data to the device across the wireless communications network includes excluding one or more payment instruments of the plurality of payment instruments based on information transmitted to the mobile wireless communications instrument from the device.

49. The apparatus of claim 42, wherein the means for securely conducting the financial transaction further comprises means for selecting one or more payment instruments using the selected user preferences and the received location information, and one or more of date and time information, biometric data associated with the user of the mobile wireless communications instrument, prior historical data in connection with use of the one or more payment instruments, and a ranking of the one or more payment instruments.

50. The apparatus of claim 42, wherein the selected one or more payment instruments comprise one or more of credit cards, debit cards, contactless cards, debit lines, coupons, loyalty cards, and stored value cards.

51. The apparatus of claim 42, further comprising means for recording the location of the mobile wireless communications instrument.

52. The apparatus of claim 42, wherein the mobile wireless communications instrument is a cellular phone.

* * * * *